United States Patent
Stenneth (10) Patent No.: US 9,576,478 B2
(45) Date of Patent: Feb. 21, 2017

(54) APPARATUS AND ASSOCIATED METHODS FOR DESIGNATING A TRAFFIC LANE

(71) Applicant: HERE Global B.V., Veldhoven (NL)

(72) Inventor: Leon Oliver Stenneth, Chicago, IL (US)

(73) Assignee: HERE GLOBAL B.V., Veldhoven (NL)

( * ) Notice: Subject to any disclaimer, the term of this patent is extended or adjusted under 35 U.S.C. 154(b) by 0 days.

(21) Appl. No.: 14/445,977

(22) Filed: Jul. 29, 2014

(65) Prior Publication Data

US 2016/0035219 A1    Feb. 4, 2016

(51) Int. Cl.
*G08G 1/00* (2006.01)
*G01C 21/26* (2006.01)
*G01C 21/32* (2006.01)
*G08G 1/01* (2006.01)

(52) U.S. Cl.
CPC .............. *G08G 1/00* (2013.01); *G01C 21/26* (2013.01); *G01C 21/32* (2013.01); *G08G 1/0112* (2013.01); *G08G 1/0129* (2013.01)

(58) Field of Classification Search
CPC ......... G01C 21/26; G01C 21/36; G01C 21/00; G01C 21/3617; G08G 1/096827
USPC ....................................................... 701/400
See application file for complete search history.

(56) References Cited

U.S. PATENT DOCUMENTS

| | | | |
|---|---|---|---|
| 4,286,846 A * | 9/1981 | Bollenbacher | B60R 1/005 359/480 |
| 5,802,492 A * | 9/1998 | DeLorme | G01C 21/3476 340/990 |
| 6,321,158 B1 * | 11/2001 | DeLorme | G01C 21/26 340/995.16 |
| 6,405,128 B1 * | 6/2002 | Bechtolsheim | G01C 21/3667 340/988 |
| 7,421,341 B1 * | 9/2008 | Hopkins | G01C 21/26 701/25 |
| 8,279,763 B2 * | 10/2012 | Rozum | G08G 1/096716 370/252 |
| 8,350,845 B2 * | 1/2013 | Soulchin | G06T 17/05 345/419 |

(Continued)

FOREIGN PATENT DOCUMENTS

| | | |
|---|---|---|
| CA | 2704638 A1 | 5/2009 |
| EP | 0921509 A2 | 6/1999 |

(Continued)

OTHER PUBLICATIONS

Liu et al., "Mining Large-Scale, Sparse GPS Traces for Map Inference: Comparison of Approaches", KDD'12, Aug. 12-16, 2012, pp. 669-677, Beijing, China.

Notification of Transmittal of the International Search Report and the Written Opinion of the International Searching Authority, or the Declaration; International Search Report; Written Opinion of the International Searching Authority for corresponding International Application No. PCT/IB2015/055405, mailed Sep. 25, 2015, 10 Pages.

*Primary Examiner* — Jerrah Edwards
*Assistant Examiner* — Majdi Alsomiri
(74) *Attorney, Agent, or Firm* — Ditthavong & Steiner, P.C.

(57) ABSTRACT

An apparatus comprising: at least one processor; and at least one memory including computer program code, the at least one memory and the computer program code configured to, with the at least one processor, cause the apparatus to perform at least the following: based on received traveller data, the traveller data representing polled traveller usage of a particular traffic lane, designating the particular traffic lane as a restricted-use lane, the designation for use in subsequent navigation guidance.

19 Claims, 5 Drawing Sheets

(56) References Cited

U.S. PATENT DOCUMENTS

| | | | |
|---|---|---|---|
| 9,008,369 B2* | 4/2015 | Schofield | G06K 9/00818 348/211.13 |
| 2003/0182052 A1* | 9/2003 | DeLorme | G01C 21/26 701/533 |
| 2004/0098194 A1* | 5/2004 | Baur | G01C 21/3492 701/533 |
| 2005/0065711 A1* | 3/2005 | Dahlgren | G01C 21/26 701/117 |
| 2008/0319646 A1* | 12/2008 | Hopkins | G01C 21/26 701/533 |
| 2009/0140887 A1* | 6/2009 | Breed | G01C 21/165 340/990 |
| 2009/0265095 A1* | 10/2009 | Hopkins | G01C 21/26 701/532 |
| 2012/0083960 A1* | 4/2012 | Zhu | G05D 1/0214 701/23 |
| 2012/0179358 A1 | 7/2012 | Chang et al. | |

FOREIGN PATENT DOCUMENTS

| | | |
|---|---|---|
| EP | 2633270 A1 | 9/2013 |
| WO | 86/05827 A1 | 10/1986 |
| WO | 2006/060518 A2 | 6/2006 |
| WO | 2009/050491 A1 | 4/2009 |
| WO | 2010023568 A2 | 3/2010 |
| WO | 2010/105713 A1 | 9/2010 |
| WO | 2011/053336 A1 | 5/2011 |
| WO | 2012/055427 A1 | 5/2012 |

* cited by examiner

Based on received traveller data, the traveller data representing polled traveller usage of a particular traffic lane, designating the particular traffic lane as a restricted-use lane, the designation for use in subsequent navigation guidance. /902

Figure 10

APPARATUS AND ASSOCIATED METHODS FOR DESIGNATING A TRAFFIC LANE

TECHNICAL FIELD

The present disclosure relates to the field of navigation devices, associated methods, computer programs and apparatus. Certain disclosed aspects/examples relate to portable electronic devices, in particular, so-called hand-portable electronic devices which may be hand-held in use (although they may be placed in a cradle in use). Such hand-portable electronic devices include so-called Satellite Navigation devices, Personal Digital Assistants (PDAs), mobile telephones, smartphones and other smart devices, smartwatches and tablet PCs.

BACKGROUND

An electronic device may provide navigation advice to a user. In some examples, a navigation device may provide advice based on whether a traffic lane is restricted to use by a particular type of vehicle. This may allow the device to provide navigation guidance that avoids directing a user to use a traffic lane that they are prohibited from using.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first aspect there is provided an apparatus comprising at least one processor; and at least one memory including computer program code, the at least one memory and the computer program code configured to, with the at least one processor, cause the apparatus to perform at least the following: based on received traveller data, the traveller data representing polled traveller usage of a particular traffic lane, designating the particular traffic lane as a restricted-use lane, the designation for use in subsequent navigation guidance.

The apparatus may be configured to designate a particular traffic lane as a restricted-use lane based on traveller data associated with a plurality of travellers with a particular discrete time window.

The apparatus may be configured to designate a particular traffic lane as a restricted-use lane by removing particular received traveller data which conforms to a predefined unrealistic data-set from further consideration in the designation.

The apparatus may be configured to use a transportation mode detection scheme to discriminate received traveller data as conforming to a particular transportation mode, the conforming-traveller-data for further use in designating the particular traffic lane as a restricted-use lane.

The apparatus may be configured to receive conforming-traveller-data from a remote server, the conforming-traveller-data based on a transportation mode detection scheme used to discriminate received traveller data as conforming to a particular transportation mode, the conforming-traveller-data for further use by the apparatus in designating the particular traffic lane as a restricted-use lane.

The received traveller data may comprise one or more of latitude, longitude, timestamp, heading and speed data for the polled traveller.

The transportation mode detection scheme may be based on the polled traveller self-identifying as using a particular transportation mode.

The particular transportation mode may be based on a number of occupants.

The transportation mode detection scheme may observe the distribution of received traveller data in and around bus stop locations to discriminate received traveller data as conforming to a bus transportation mode.

One or more of a frequency and time spent in and around a bus stop location may be used to discriminate received traveller data as conforming to a bus transportation mode.

A Euclidian distance to a closest bus stop may be used to discriminate received traveller data as conforming to a bus transportation mode.

A time stamp of received traveller data may be compared to an expected bus stop service schedule to discriminate received traveller data as conforming to a bus transportation mode.

The apparatus may be configured to use received traveller data which is beyond a minimum threshold distance from bus stops to mitigate a bus stop effect on received traveller data.

The apparatus may be configured to use received traveller data which is mapped to the centre of a particular traffic lane in designating the particular traffic lane as a restricted use lane.

The apparatus may be configured to use constructed route geometries for the centre-mapped-received-traveller-data in designating the particular traffic lane as a restricted-use lane.

The apparatus may be configured to, for each constructed route geometry for the centre-mapped-received-traveller-data, use the differing distribution of bus-transportation-mode-discriminated-received-traveller-data, which has been filtered to mitigate the bus stop effect of received traveller data, and other-transportation-mode-discriminated-received-traveller-data to designate the associated traffic lane as a restricted-use lane.

The apparatus may be configured to, for each constructed route geometry for the centre-mapped-received-traveller-data, use a temporal difference in distribution of bus-transportation-mode-discriminated-received-traveller-data to designate the associated traffic lane as a restricted-use lane.

The apparatus may be configured to perform at least the following steps: remove particular received traveller data, which conforms to a predefined unrealistic data-set from further consideration in the designation, thereby to provide remaining-traveller-data; use a transportation mode detection scheme on the remaining-traveller-data to discriminate the remaining-traveller-data as conforming to a bus transportation mode thereby to provide bus-transportation-mode-traveller-data; use the bus-transportation-mode-traveller-data that is beyond a minimum threshold distance from bus stops to mitigate a bus stop effect on received traveller data thereby to provide remaining-bus-transportation-mode-traveller-data; use centre lane mapping on the remaining-bus-transportation-mode-traveller-data thereby to provide centre-mapped-traveller-data; use constructed route geometries on the centre-mapped-traveller-data thereby to provide constructed-route-geometry-traveller-data for each of a plurality of traffic lanes; designate a particular traffic lane as a restricted-use lane based on the constructed-route-geometry-traveller-data for each of the plurality of traffic lanes.

In a further aspect there is provided a method comprising, based on received traveller data, the traveller data representing polled traveller usage of a particular traffic lane, designating the particular traffic lane as a restricted-use lane, the designation for use in subsequent navigation guidance.

In a further aspect there is provided a computer readable medium comprising computer program code stored thereon, the computer readable medium and computer program code being configured to, when run on at least one processor, perform at least the following: based on received traveller data, the traveller data representing polled traveller usage of a particular traffic lane, designate the particular traffic lane as a restricted-use lane, the designation for use in subsequent navigation guidance.

The present disclosure includes one or more corresponding aspects, examples or features in isolation or in various combinations whether or not specifically stated (including claimed) in that combination or in isolation. Corresponding means and corresponding functional units or performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS

Certain embodiments disclosed herein may be considered to provide an apparatus comprising at least one processor and at least one memory including computer program code, the at least one memory and the computer program code configured to, with the at least one processor, cause the apparatus to perform at least the following, based on received traveller data, the traveller data representing polled traveller usage of a particular traffic lane, designating the particular traffic lane as a restricted-use lane, the designation for use in subsequent navigation guidance.

For example, the apparatus may designate a particular traffic lane as a bus lane, which only buses are permitted to use. Subsequent navigation advice may then take this designation into account such that a user of the apparatus travelling within a car may be advised to follow a route that avoids the bus lane. Advantageously, traveller data is used rather than having to manually collect and upload restricted-use lane designations. This is also advantageous as restricted use-lane designations may be updated/changed/added over time, and they may also have particular times of operation (e.g. during morning/evening rush-hour, which may also be updated/changed/added). In the case of particular times of operation, this does also not have to be manually but can be observed using the dynamic traveller data which would also reflect the dynamic designation of a traffic lane as a restricted-use lane.

Figure 1:
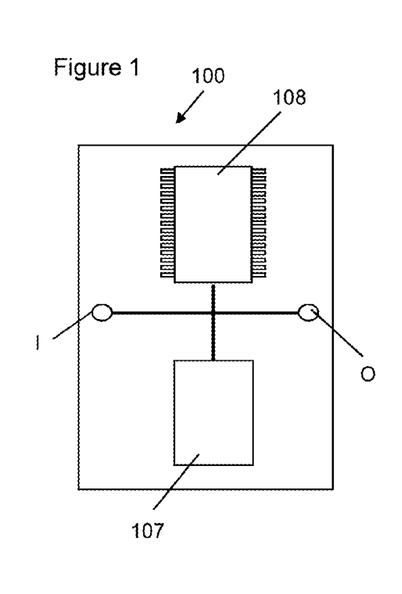
FIG. 1 illustrates an example apparatus embodiment comprising a number of electronic components, including memory and a processor, according to embodiments of the present disclosure.

FIG. 1 shows an apparatus 100 comprising memory 107, a processor 108, input I and output O. In this embodiment only one processor and one memory are shown but it will be appreciated that other embodiments may utilise more than one processor and/or more than one memory (e.g. same or different processor/memory types).

In this embodiment the apparatus 100 is an Application Specific Integrated Circuit (ASIC) for a portable electronic device with a touch sensitive display. In other embodiments the apparatus 100 can be a module for such a device, or may be the device itself, wherein the processor 108 is a general purpose Central Processing Unit (CPU) of the device and the memory 107 is general purpose memory comprised by the device.

The input I allows for receipt of signalling to the apparatus 100 from further components, such as components of a portable electronic device (like a touch-sensitive or hover-sensitive display) or the like. The output O allows for onward provision of signalling from within the apparatus 100 to further components such as a display screen, speaker, or vibration module. In this embodiment the input I and output O are part of a connection bus that allows for connection of the apparatus 100 to further components.

The processor 108 is a general purpose processor dedicated to executing/processing information received via the input I in accordance with instructions stored in the form of computer program code on the memory 107. The output signalling generated by such operations from the processor 108 is provided onwards to further components via the output O.

The memory 107 (not necessarily a single memory unit) is a computer readable medium (solid state memory in this example, but may be other types of memory such as a hard drive, ROM, RAM, Flash or the like) that stores computer program code. This computer program code stores instructions that are executable by the processor 108, when the program code is run on the processor 108. The internal connections between the memory 107 and the processor 108 can be understood to, in one or more example embodiments, provide an active coupling between the processor 108 and the memory 107 to allow the processor 108 to access the computer program code stored on the memory 107.

In this example the input I, output O, processor 108 and memory 107 are all electrically connected to one another internally to allow for electrical communication between the respective components I, O, 107, 108. In this example the components are all located proximate to one another so as to be formed together as an ASIC, in other words, so as to be integrated together as a single chip/circuit that can be installed into an electronic device. In other examples one or more or all of the components may be located separately from one another.

Figure 2:
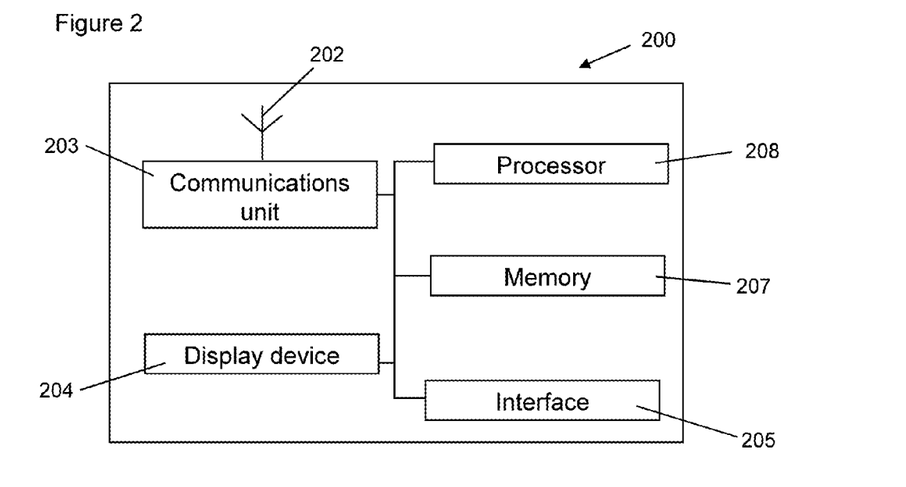
FIG. 2 illustrates an example apparatus embodiment comprising a number of electronic components, including memory, a processor and a communication unit, according to embodiments of the present disclosure.

FIG. 2 depicts an apparatus 200 of a further example embodiment, such as a mobile phone. In other example embodiments, the apparatus 200 may comprise a module for a mobile phone (or PDA or audio/video player), and may just comprise a suitably configured memory 207 and processor 208.

The example embodiment of FIG. 2 comprises a display device 204 such as, for example, a liquid crystal display (LCD), e-Ink, hover-screen or touch-screen user interface. The apparatus 200 of FIG. 2 is configured such that it may receive, include, and/or otherwise access data. For example, this example embodiment 200 comprises a communications unit 203, such as a receiver, transmitter, and/or transceiver, in communication with an antenna 202 for connecting to a wireless network and/or a port (not shown) for accepting a physical connection to a network, such that data may be received via one or more types of networks. This example embodiment comprises a memory 207 that stores data, possibly after being received via antenna 202 or port or after being generated at the user interface 205. The processor 208 may receive data from the user interface 205, from the memory 207, or from the communication unit 203. It will be appreciated that, in certain example embodiments, the display device 204 may incorporate the user interface 205. Regardless of the origin of the data, these data may be outputted to a user of apparatus 200 via the display device 204, and/or any other output devices provided with apparatus. The processor 208 may also store the data for later use in the memory 207. The memory 207 may store computer program code and/or applications which may be used to instruct/enable the processor 208 to perform functions (e.g. read, write, delete, edit or process data).

Figure 3:
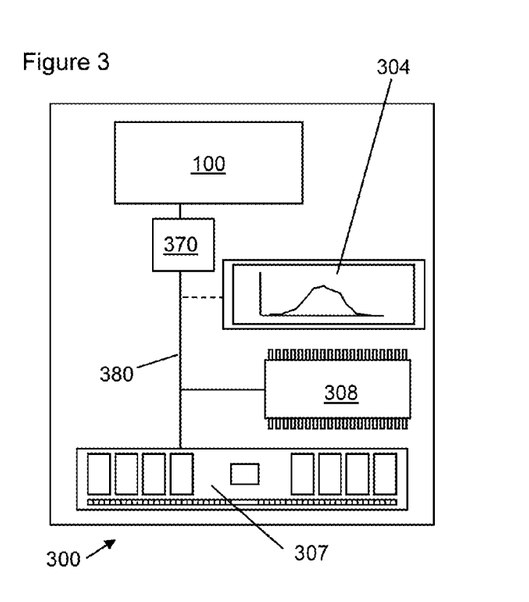
FIG. 3 illustrates an example apparatus embodiment comprising a number of electronic components, including memory and a processor, according to embodiments of the present disclosure.

FIG. 3 depicts a further example embodiment of an electronic device 300, such as a tablet personal computer, a portable electronic device, a portable telecommunications device, a server or a module for such a device, the device comprising the apparatus 100 of FIG. 1. The apparatus 100 can be provided as a module for device 300, or even as a processor/memory for the device 300 or a processor/memory for a module for such a device 300. The device 300 comprises a processor 308 and a storage medium 307, which are connected (e.g. electrically and/or wirelessly) by a data bus 380. This data bus 380 can provide an active coupling between the processor 308 and the storage medium 307 to allow the processor 308 to access the computer program code. It will be appreciated that the components (e.g. memory, processor) of the device/apparatus may be linked via cloud computing architecture. For example, the storage device may be a remote server accessed via the internet by the processor.

The apparatus 100 in FIG. 3 is connected (e.g. electrically and/or wirelessly) to an input/output interface 370 that receives the output from the apparatus 100 and transmits this to the device 300 via data bus 380. Interface 370 can be connected via the data bus 380 to a display 304 (touch-sensitive or otherwise) that provides information from the apparatus 100 to a user. Display 304 can be part of the device 300 or can be separate. The device 300 also comprises a processor 308 configured for general control of the apparatus 100 as well as the device 300 by providing signalling to, and receiving signalling from, other device components to manage their operation.

The storage medium 307 is configured to store computer code configured to perform, control or enable the operation of the apparatus 100. The storage medium 307 may be configured to store settings for the other device components. The processor 308 may access the storage medium 307 to retrieve the component settings in order to manage the operation of the other device components. The storage medium 307 may be a temporary storage medium such as a volatile random access memory. The storage medium 307 may also be a permanent storage medium such as a hard disk drive, a flash memory, a remote server (such as cloud storage) or a non-volatile random access memory. The storage medium 307 could be composed of different combinations of the same or different memory types.

Figure 4:
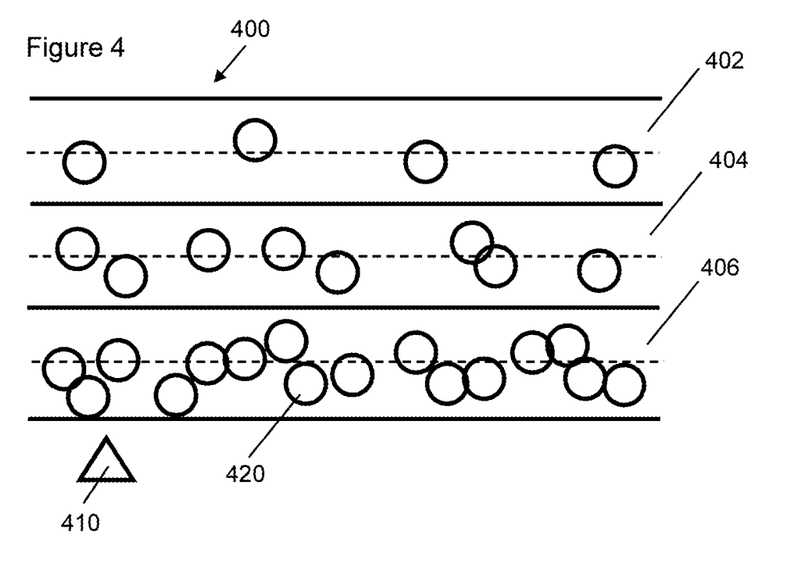
FIG. 4 illustrates data relating to the position of a plurality of vehicles on a three-lane highway with a bus-stop.

FIG. 4 represents traveller data 400 relating to a plurality of travellers on a three-lane highway comprising a first lane 402, a second lane 404, and a third lane 406. The third lane 406 is provided with a bus stop 410. For a navigation device with access to the traveller data 400, it may be desirable to determine whether any restrictions apply to the use of any particular lane of the highway such that navigation advice can be provided that is compliant with those restrictions. Techniques for analysing the traveller data to enable provision of such advice will be disclosed below.

In some examples, traveller data relating to an individual traveller 420 may be provided by a component of a vehicle, such as a satellite navigation system, or in other examples the traveller data may be provided by an electronic device carried within a vehicle, such as a smartphone. Generally, components or devices configured to provide this traveller data may be referred to as probes. The traveller data may include the position of the probe, such as the latitude and longitude, the speed, the heading and a timestamp, to identify the time to which the traveller data relates, together with (optionally) data configured to uniquely identify the probe. Such traveller data may be provided periodically to reflect the behaviour of the probe of a particular interval of time. In some examples the traveller data may be provided in response to a request whereby a traveller is polled as to their position, speed or heading.

Where traveller data relating to a plurality of probes is available, valuable information may be extracted from the traveller data by analysing the behaviour of the probes during a particular discrete time window. This analysis may be performed in real time as data from probes is updated, or it may be performed on historical data that has previously been recorded.

To ensure the validity of the traveller data, the information relating to each probe may be compared to a predetermined range of values to see which of the traveller data conform to an unrealistic data set in order to remove any probes with unrealistic characteristics from further consideration. For example, probes that indicate a speed in excess of 150 miles per hour, or probes that indicate a position outside of a set of co-ordinates, such as a city's limits, may be removed from further consideration. The traveller data 400 of FIG. 4 can actually be considered to be such remaining-traveller-data as the traveller data which conforms to the predefined unrealistic data-set is not shown/has been removed. This can be considered to be an optional step, but it will be appreciated that if remaining-traveller-data, rather than the original traveller data set, is used then better designation of a restricted-use traffic lane can be obtained.

Figure 5A:
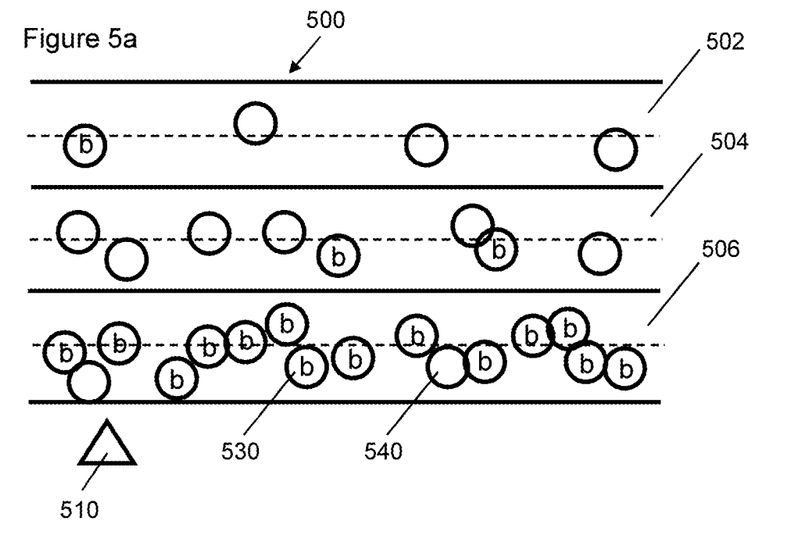
FIG. 5a illustrates the data of FIG. 4 wherein a subset of the plurality of vehicles have been identified as buses.

FIG. 5a represents the remaining-traveller-data 500 of FIG. 4 once analysis has been completed to determine the nature of each probe. Features of the data 500 that are similar to the similar to the data 400 shown in FIG. 4 have been given corresponding reference numerals and will not necessarily be discussed in order to improve the clarity of the disclosure. In this step, the analysis is directed to identifying if a probe relates to a traveller on a bus (a so-called bus probe 530) or to a traveller in some other type of vehicle such as a car (a so-called non-bus probe 540). By identifying each probe as a bus probe or non-bus probe and analysing the behaviour of the probes it may be possible to determine if any particular traffic lane has been designated a bus lane such that vehicles other than busses may be prohibited from using the traffic lane.

A variety of different techniques/schemes may be employed to analyse the remaining-traveller-data 500 (or traveller data in the case that the optional step of removal of unrealistic traveller data is not done) in order to distinguish between bus probes and non-bus probes. Such schemes can be considered to be transportation mode detection schemes. In the case of buses, the transportation mode detection scheme may use the feature that buses characteristically stop at bus stops to allow travellers to enter and exit the vehicle. The location of bus stops may be known information. In some examples, the remaining-traveller-data 500 may be analysed to identify probes that spend greater than a predetermined time within a predetermined distance of a known bus stop. Such probes may then be categorised as bus probes.

Figure 5B:
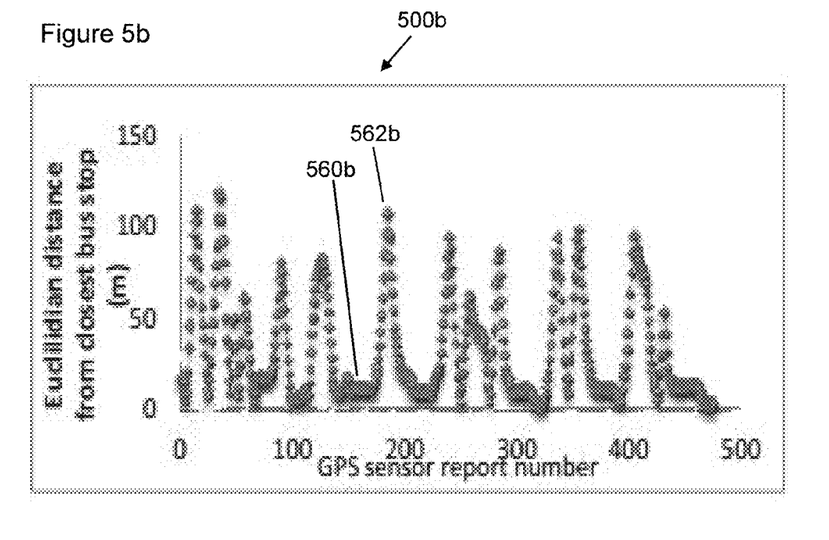
FIG. 5b illustrates Euclidian distance variation from the closest bus stop.

FIG. 5b shows the Euclidean distance between a probe and a nearest known bus stop for a series of points in time 500b. As the probe proceeds along a highway the Euclidean distance, that is the shortest straight line distance, to a nearest bus stop will reduce towards zero 560b as the probe approaches the bus stop. Subsequently, the Euclidean distance will increase to a maximum value 562b at a point equidistance from two successive bus stops, before then declining again as a new bus stop is approached. Analysis of the distribution of this Euclidean distance data as a function of time may be used to identify whether the probe is a bus probe or a non-bus probe. The propensity of buses to stop regularly at bus stops will be reflected in the distribution of Euclidean distance data, allowing the identification of bus probes even if the location of bus stops is unknown. The Euclidean distance data for a bus probe may be characterised by a clustering of data points at close to zero distance at periodic intervals. Conversely, non-bus probes are unlikely to slow down and stop at a series of points along a particular traffic lane such that the distribution of Euclidean distance data for a non-bus probe is likely to be quite different to the distribution for bus probes. Of course, the present disclosure encompasses other distance measurements to a closest bust stop for use in discriminating the received traveller data as conforming to a bus transportation mode.

The time at which a bus is scheduled to stop at a bus stop may be known information. In some examples the data 500 may be analysed to identify a correlation between the location of a probe and the location of a known bus stop at times coincident with the schedule of known bus stop times. Where the correlation exceeds a predetermined threshold the probe may be categorised as a bus probe.

In some examples a probe may self-identify as a bus probe. For example, a satellite navigation system installed within a bus may be configured to identify itself as a bus probe. In other examples, a user may provide an input to an electronic device that identifies it as a bus probe; a traveller may provide such an input into their smartphone when they board a bus. Non-bus probes may similarly be configured to identify themselves as non-bus probes. It will be appreciated that the self-identification is not just limited to identification as a bus or non-bus probe. The self-identification could, in certain examples, be bicycle, taxi, high-occupancy (e.g. where use in designating a particular lane as a high-occupancy lane which as a particular time window (e.g. morning/afternoon rush-hour) of operation) transportation mode.

In some examples a combination of the above techniques may be used to designate each probe as either a bus probe or a non-bus probe. Bus probes may be present in any particular traffic lane and similarly non-bus probes may also be present in any particular lane. It will be appreciated that the result is to provide, in the case of using a bus transportation mode detection scheme, bus-transportation-mode-traveller-data. The probes labelled "b" in FIG. 5a can be considered to be such data.

Figure 6:
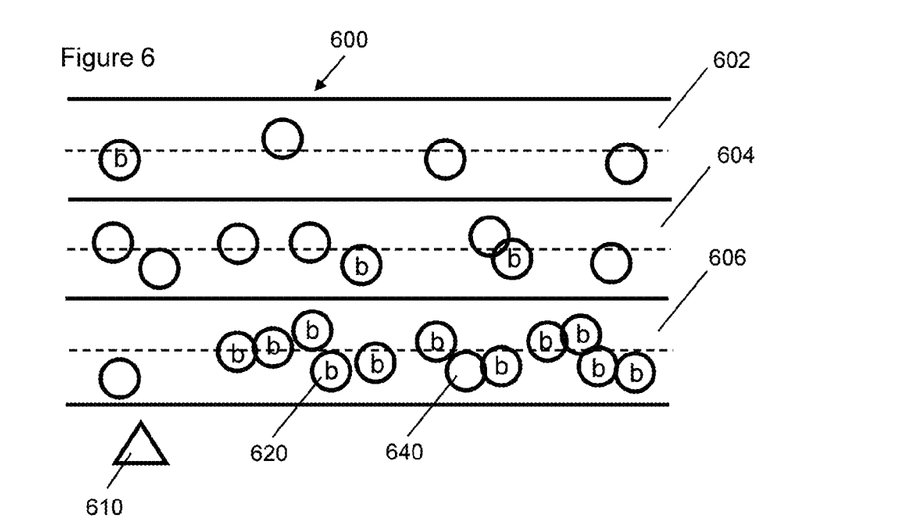
FIG. 6 illustrates the data of FIG. 5 wherein data relating to vehicles within a certain distance of the bus-stop have been removed.

In order to determine whether any restriction is in place on the type of vehicle that may use any particular traffic lane it may be advantageous to remove certain probes from further consideration. FIG. 6 illustrates the data set of probes 600 remaining once bus probes that are within a predetermined distance of a bus stop 610 have been removed from the data set. The predetermined distance may be 20 meters or any other appropriate distance. The purpose of removing bus probes that are within a particular distance from a bus stop is to avoid false positive identification of a traffic lane as being a bus lane (mitigate the bus stop effect). Since buses characteristically stop at bus stops it may be expected that a high proportion of probes in the vicinity of a bus stop may be bus probes, independently of whether the portion of traffic lane in the vicinity of the bus stop is a bus lane or not. Since the presence of bus probes in the vicinity of a bus stop is unlikely to provide assistance in determining the characteristics of a particular traffic lane these bus probes may be removed from further consideration. The probes "b" in FIG. 6 thus illustrate remaining-bus-transportation-mode-traveller-data as the bus-transportation-mode-traveller-data that is beyond a predetermined minimum threshold distance from bus stops are shown, and the bus-transportation-mode-data within a predetermined minimum threshold are not shown as they have been removed to mitigate the bus stop effect.

Figure 7:
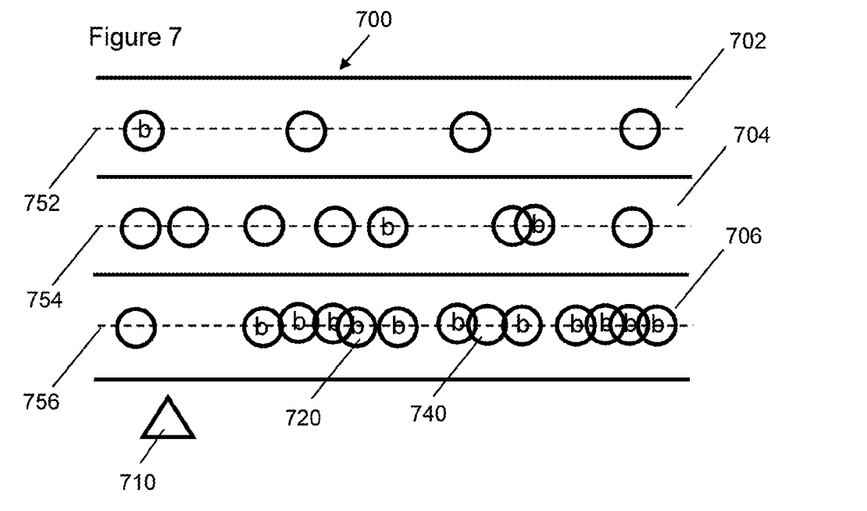
FIG. 7 illustrates the data of FIG. 6 wherein the location of each vehicle has been mapped to the centre-line of the relevant lane.

FIG. 7 illustrates centre-mapped-received-traveller-data 700 derived from the data 600 shown in FIG. 6 once a process of centre-lane map matching has been performed. Where a particular highway has a plurality of traffic lanes it may be possible to identify in which lane a particular traveller is travelling. In some examples the position of a probe during a particular time interval may be analysed to determine which particular lane the probe has been travelling in during that time interval. In other examples the probe's speed or heading may be analysed to determine the lane in which the probe is travelling. In other examples a combination of different characteristics of the probe may be used to establish in which lane the probe is travelling. Once the particular lane that a particular probe relates to have been established the probe may be assigned to a centre line for that particular lane. In the present example, four probes travelling in a first lane 702 have been assigned to a first centre line 752. The remaining probes have been assigned to either a second centre line 754 where they have been identified as travelling in a second lane 704 or to a third centre line 756 where they have been identified as travelling in the third lane 706. The process of segregating probes into different lanes may enable identification of restrictions present in a particular traffic lane of a highway while other traffic lanes of the same highway may be identified as being free of restrictions.

Where traveller data, relating to a plurality of probes, has been obtained it will be possible to infer road maps from the traveller data. Such road maps may encompass a comprehensive network of roads, within a given area, that includes information relating to how each road or highway is connected to other roads or highways within the network.

Construction of such a road map may be successfully performed even where probe data is sparse and/or error prone. As such road maps reflect the geometry of a network of highways they may be referred to as constructed route geometries.

In some examples, centre-mapped-received-traveller-data may be used to provide a constructed route geometry. In such cases, the constructed route geometry may distinguish each individual traffic lane within each highway to provide a lane-level constructed route geometry. Where a constructed route geometry is available individual probes may be designated as being within a particular part of the constructed route geometry to provide constructed-route-geometry-traveller data. Analysis of this constructed-route-geometry-traveller data may provide a detailed map of possible restricted-use traffic lanes in addition to non-restricted-use traffic lanes.

At this stage, a navigation device may be configured to use this constructed-route-geometry-traveller data of possible routes where restricted-use traffic lanes have been designated to provide up-to-date guidance to a traveller. Accordingly, use of such appropriately designated restricted use traffic lanes would not disadvantageously direct the traveller to attempt to use particular traffic lanes, such as bus lanes, that the traveller is prohibited from using. Such a traveller would then not be penalized for using a restricted-use traffic lane. The traveller can then identify the restriction in good time and thus they may modify their route to avoid it.

In some examples a constructed route geometry may be used to analyse centre-mapped-received-traveller data to provide bus-transportation-mode-discriminated-received-traveller data, which relates to probes identified as bus probes and which has been filtered to mitigate the bus stop effect, and other-transportation-mode-discriminated-received-traveller data, which relates to non-bus probes. Designation of a particular traffic lane as a restricted-use lane may be based on differences in the distribution of the bus-transportation-mode-discriminated-received-traveller data compared to the distribution of other-transportation-mode-discriminated-received-traveller data. For example, where the bus-transportation-mode-discriminated-received-traveller data comprises a distribution of bus probes with a high density in a particular traffic lane, while simultaneously the other-transportation-mode-discriminated-received-traveller data comprises a distribution of non-bus probes with a low density in the particular traffic lane, the particular traffic lane may be designated as a restricted-use or bus lane.

The designation of a lane as a restricted-use lane may be based on thresholds. In an example, the apparatus may identify bus lanes by analysing the proportion of bus probes and the proportion of non-bus probes present in a particular traffic lane. For example, if the proportion of bus probes using a particular traffic lane exceeds 95% then it may be determined that the particular lane is a bus lane. It will be appreciated that different percentages may be chosen but that the presence of a small percentage of non-bus probes present in a particular traffic lane may not be inconsistent with the particular lane being a bus lane as a small proportion of travellers may operate in contravention of the restriction.

In some examples an apparatus may designate a particular traffic lane as a bus lane based on the proportion of bus probes and non-bus probes present in adjacent traffic lanes as well as the proportion present in the particular traffic lane. For example, if 90% of probes present in the particular traffic lane are bus probes while 95% of probes in an adjacent traffic lane are non-bus probes then the particular lane may be designated as a bus lane based on the degree of segregation of the bus and non-bus probes as between the adjacent lanes In other examples, designation of a particular traffic lane may be based on a comparison between data relating to a current time interval and to data relating to a previous time interval. For example, if the proportion of bus probes present in a particular traffic lane in a previous time interval was 20% while the proportion present in the current time interval is 90% then the lane may be designated as a bus lane based on the change in observed probe behaviour. In other examples, a significant increase in the number of non-bus probes in a particular traffic lane may result in an apparatus re-designating the traffic lane as a non-restricted use traffic lane. It will be appreciated that any convenient time interval may be chosen, for example the previous time interval may be a period of six months or one month or one week, while the current time interval may be a day or an hour or ten minutes. It will be appreciated that the time intervals may relate to a fixed periods of time or to sliding time windows.

In some examples, designation of a particular traffic lane may be performed on a regular basis such as every minute, or hourly or daily. This may enable an apparatus to update the designation as new restrictions are introduced or existing restrictions are rescinded. This may also enable an apparatus to establish a pattern of restrictions that varies over time. In some examples a restriction may only apply during certain time of the day, such as between 7 am and 7 pm, or on certain days of the week, such as weekdays and not weekends or public holidays. Using this information, an apparatus may provide navigation guidance that directs a user to use a particular traffic lane only if their expected time of arrival at that traffic lane coincides with a time that the traffic lane is predicted to be subject to no restrictions. If the user's expected time of arrival at the particular traffic lane coincides with a period during which a restriction is predicted to apply then the apparatus may formulate alternative guidance configured to avoid that particular traffic lane.

In some examples, an apparatus may be configured to perform the analysis disclosed above in relation to a plurality of portions of a particular traffic lane. This may enable the apparatus to detect the presence of restrictions on traffic lane usage that apply to only short sections of a particular traffic lane, such as in the vicinity of a particular intersection. It will be appreciated that a particular traffic lane may be divided into portions of any convenient length, such as 10 meters, or 50 meters or 100 meters.

In some examples, an apparatus may provide navigation guidance based on the speed of movement of probes, thereby directing a traveller to use a route that minimizes their journey time. However, if the route includes a particular traffic lane that is predicted to be a restricted use traffic lane, such as a bus lane, at the time that the user is predicted to reach that traffic lane then the device may provide alternative navigation advice such that the traveller may avoid using the restricted lane. In such examples it may be particularly advantageous to establish the designation of different traffic lanes within the same highway as a bus lane may have probes with a relatively high average speed compared to a lower average speed of probes travelling in adjacent traffic lanes, which may be more congested. If a navigation device is not configured to determine the designation of a bus lane then it may advise a user that use of such a bus lane provides an optimum route to minimize total journey time. However, such a route would not be suitable for a non-bus traveller, potentially resulting in the traveller using the adjacent traffic lanes and thereby travelling at a much lower speed. Provision of navigation advice based on both speed of probes and designation of particular traffic lanes as restricted use traffic lanes may thereby provide more time-efficient navigation advice.

It will be appreciated that different types of restrictions may apply to particular traffic lanes, of which restriction to use by buses is only a single example. In some examples other vehicles may be permitted to use restricted use traffic lanes, such as taxis, bicycles or motorcycles. In other examples, restrictions may relate to the number of occupants of a vehicle. For example, it may be prohibited to drive a car on a particular traffic lane unless there are at least two or more persons within the car. In such cases, a user may provide an input to their device to identify the number of persons within their vehicle and the device may thereby provide navigation advice that complies with any restrictions on the number of occupants within the vehicle. In other examples it may be prohibited to drive a vehicle larger than a certain size or weight on a particular traffic lane. Such restrictions may apply specifically to goods vehicles, but may only apply during certain hours of the day. By analysing data relating to probes using highways within a particular area it may be possible to provide navigation guidance that complies with any relevant restrictions to traffic lane usage.

Figure 8A:
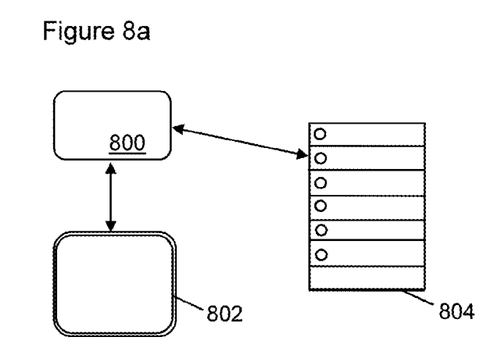
FIGS. 8a-8b illustrate an electronic device in communication with a remote server and a cloud according to embodiments of the present disclosure.
Figure 8B:
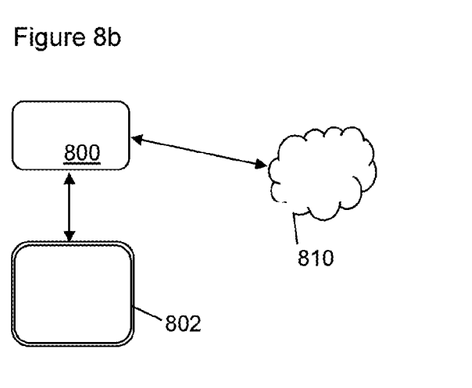

FIG. 8a shows an example of an apparatus 800 in communication with a remote server. FIG. 8b shows an example of an apparatus 800 in communication with a "cloud" for cloud computing. In FIGS. 8a and 8b, apparatus 800 (which may be apparatus 100, 200 or 300) is also in communication with a further apparatus 802. The further apparatus 802 may be for example configured to perform some part or parts of the analysis of probes disclose above. In other examples, the apparatus 800 and further apparatus 802 may both be comprised within a device such as a navigation device or a portable communications device or PDA. Communication may be via a communications unit, for example.

FIG. 8a shows the remote computing element to be a remote server 804, with which the apparatus 800 may be in wired or wireless communication (e.g. via the internet, Bluetooth, NFC, a USB connection, or any other suitable connection as known to one skilled in the art). In FIG. 8b, the apparatus 800 is in communication with a remote cloud 810 (which may, for example, be the Internet, or a system of remote computers configured for cloud computing). It will be appreciated that the traveller data may be received by the server/cloud 804/810 and the apparatus 800 can then use the polled traveller data to designate a particular lane as a restricted-use lane.

Figure 9:
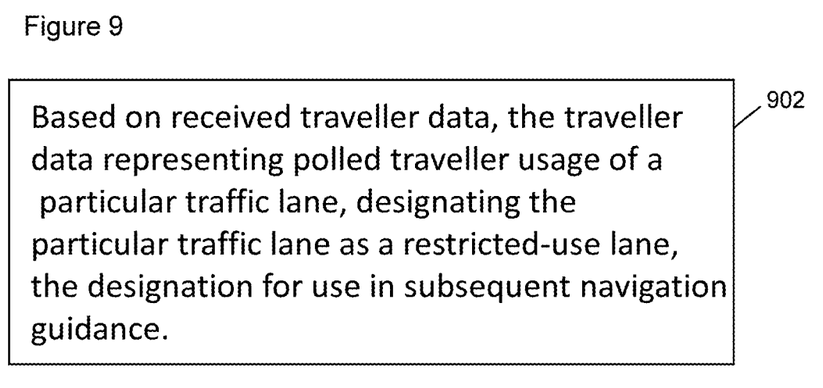
FIG. 9 illustrates a flowchart according to a method of the present disclosure.

FIG. 9 shows a flow diagram illustrating the method 902 comprising, based on received traveller data, the traveller data representing polled traveller usage of a particular traffic lane, designating the particular traffic lane as a restricted-use lane, the designation for use in subsequent navigation guidance.

Figure 10:
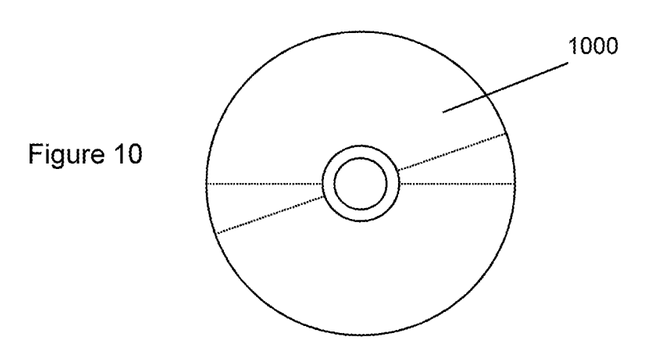
FIG. 10 illustrates schematically a computer readable medium providing a program.

FIG. 10 illustrates schematically a computer/processor readable medium 1000 providing a program according to an example. In this example, the computer/processor readable medium is a disc such as a digital versatile disc (DVD) or a compact disc (CD). In other examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

The apparatus shown in the above examples may be a portable electronic device, a laptop computer, a mobile phone, a smartphone, a tablet computer, a personal digital assistant, a navigation device, a watch, a digital camera, a non-portable electronic device, a server, a monitor/display, or a module/circuitry for one or more of the same.

Any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc.), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus for generating navigation guidance instructions for presentation by a navigation device comprising:
   at least one processor; and
   at least one memory including computer program code, the at least one memory and the computer program code configured to, with the at
   least one processor, using an Application Specific Integrated Circuit (ASIC), cause the apparatus to perform at least the following:
      receiving traveler data, the traveler data provided by a component of a vehicle and representing polled traveler usage of a particular traffic lane;
      designating the particular traffic lane as a restricted-use lane, by removing any particular received traveler data which conforms to a predefined unrealistic data-set from further consideration in the designation, the predefined unrealistic data-set including one or more of unrealistic speed traveler data and unrealistic position traveler data;
      generating subsequent navigation guidance based on the designating of the particular traffic lane as a restricted-use lane; and
      presenting the subsequent navigation guidance on the navigation device.

2. The apparatus of claim 1, wherein the apparatus is configured to designate a particular traffic lane as a restricted-use lane based on traveler data associated with a plurality of travelers with a particular discrete time window.

3. The apparatus of claim 1, wherein the apparatus is configured to use a transportation mode detection scheme to discriminate received traveler data as conforming to a particular transportation mode, the conforming-traveler-data for further use in designating the particular traffic lane as a restricted-use lane.

4. The apparatus of claim 3, wherein the transportation mode detection scheme is based on the polled traveler self-identifying as using a particular transportation mode.

5. The apparatus of claim 4, wherein the particular transportation mode is based on a number of occupants.

6. The apparatus of claim 3, wherein the transportation mode detection scheme observes the distribution of received traveler data in and around bus stop locations to discriminate received traveler data as conforming to a bus transportation mode.

7. The apparatus of claim 6, wherein one or more of a frequency and time spent in and around a bus stop location is used to discriminate received traveler data as conforming to a bus transportation mode.

8. The apparatus of claim 6, wherein a distance to a closest bus stop is used to discriminate received traveler data as conforming to a bus transportation mode.

9. The apparatus of claim 6, wherein a time stamp of received traveler data is compared to an expected bus stop service schedule to discriminate received traveler data as conforming to a bus transportation mode.

10. The apparatus of claim 6, wherein the apparatus is configured to use received traveler data which is beyond a minimum threshold distance from bus stops to mitigate a bus stop effect on received traveler data.

11. The apparatus of claim 3, wherein the apparatus is configured to use received traveler data which is mapped to the center of a particular traffic lane in designating the particular traffic lane as a restricted use lane.

12. The apparatus of claim 11, wherein the apparatus is configured to use constructed route geometries for the center-mapped-received-traveler-data in designating the particular traffic lane as a restricted-use lane.

13. The apparatus of claim 12, wherein the apparatus is configured to, for each constructed route geometry for the center-mapped-received-traveler-data, use the differing distribution of bus-transportation-mode-discriminated-received-traveler-data, which has been filtered to mitigate the bus stop effect of received traveler data, and other-transportation-mode-discriminated-received-traveler-data to designate the associated traffic lane as a restricted-use lane.

14. The apparatus of claim 13, wherein the apparatus is configured to, for each constructed route geometry for the center-mapped-received-traveler-data, use a temporal difference in distribution of bus-transportation-mode-discriminated-received-traveler-data to designate the associated traffic lane as a restricted-use lane.

15. The apparatus of claim 1, wherein the apparatus is configured to receive conforming-traveler-data from a remote server, the conforming-traveler-data based on a transportation mode detection scheme used to discriminate received traveler data as conforming to a particular transportation mode, the conforming-traveler-data for further use by the apparatus in designating the particular traffic lane as a restricted-use lane.

16. The apparatus of claim 1, wherein the received traveler data comprise one or more of latitude, longitude, timestamp, heading and speed data for the polled traveler.

17. The apparatus of claim 1, wherein the apparatus is configured to perform at least the following steps:
- remove particular received traveler data, which conforms to a predefined unrealistic data-set from further consideration in the designation, thereby to provide remaining-traveler-data;
- use a transportation mode detection scheme on the remaining-traveler-data to discriminate the remaining-traveler-data as conforming to a bus transportation mode thereby to provide bus-transportation-mode-traveler-data;
- use the bus-transportation-mode-traveler-data that is beyond a minimum threshold distance from bus stops to mitigate a bus stop effect on received traveler data thereby to provide remaining-bus-transportation-mode-traveler-data;
- use center lane mapping on the remaining-bus-transportation-mode-traveler-data thereby to provide center-mapped-traveler-data;
- use constructed route geometries on the center-mapped-traveler-data thereby to provide constructed-route-geometry-traveler-data for each of a plurality of traffic lanes;
- designate a particular traffic lane as a restricted-use lane based on the constructed-route-geometry-traveler-data for each of the plurality of traffic lanes.

18. A method for generating navigation guidance instructions for presentation by a navigation device comprising:
- receiving, by an Application Specific Integrated Circuit (ASIC), traveler data, the traveler data provided by a component of a vehicle and representing polled traveler usage of a particular traffic lane;
- designating the particular traffic lane as a restricted-use lane by removing any particular received traveler data which conforms to a predefined unrealistic data-set from further consideration in the designation, the predefined unrealistic data-set including one or more of unrealistic speed traveler data and unrealistic position traveler data;
- generating subsequent navigation guidance based on the designating of the particular traffic lane as a restricted-use lane; and
- presenting the subsequent navigation guidance on the navigation device.

19. A non-transitory computer readable medium comprising computer program code stored thereon, the computer readable medium and computer program code being configured to, when run on at least one processor, using an Application Specific Integrated Circuit (ASIC), perform at least the following:
- receive traveler data, the traveler data provided by a component of a vehicle and representing polled traveler usage of a particular traffic lane,
- designate the particular traffic lane as a restricted-use lane by removing any particular received traveler data which conforms to a predefined unrealistic data-set from further consideration in the designation, the predefined unrealistic data-set including one or more of unrealistic speed traveler data and unrealistic position traveler data;
- generate subsequent navigation guidance based on the designating of the particular traffic lane as a restricted-use lane; and
- present the subsequent navigation guidance on the navigation device.

\* \* \* \* \*